July 24, 1962 B. KOHLI 3,045,661
CENTRAL HEATING BOILER WITH COOKING PLATE
Filed Jan. 24, 1961 2 Sheets-Sheet 1
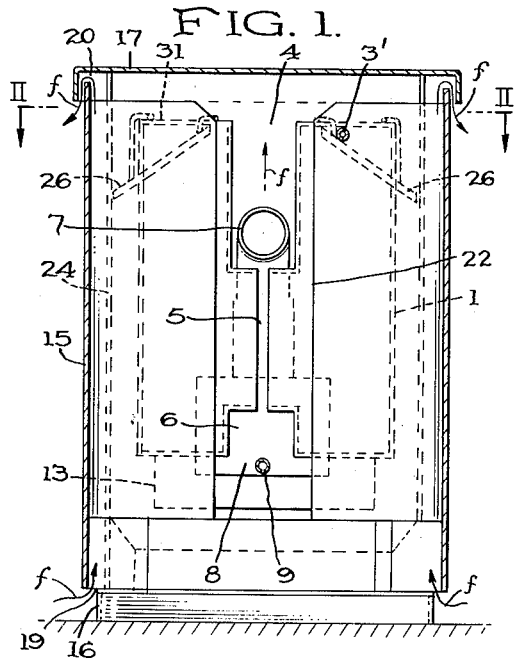
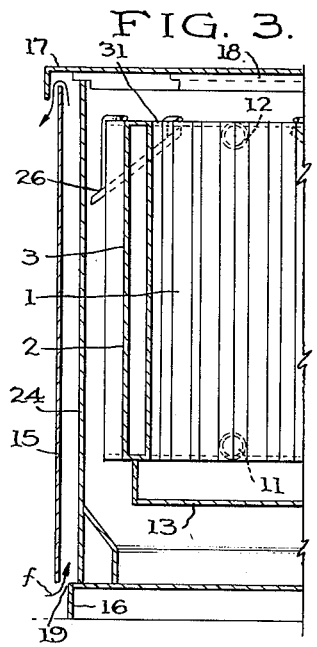
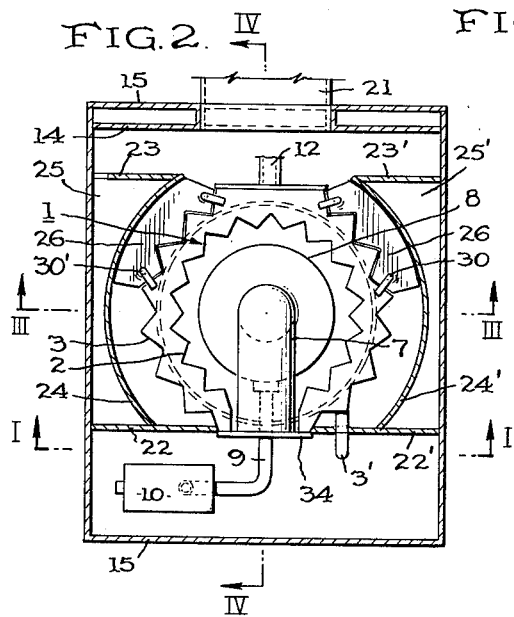
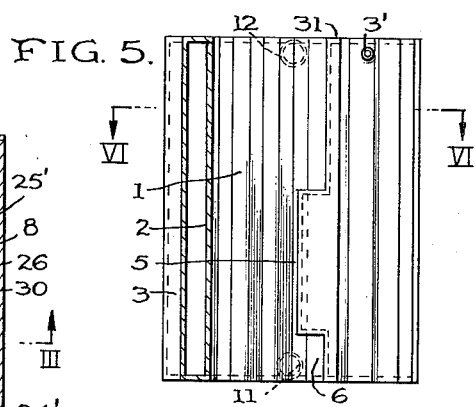
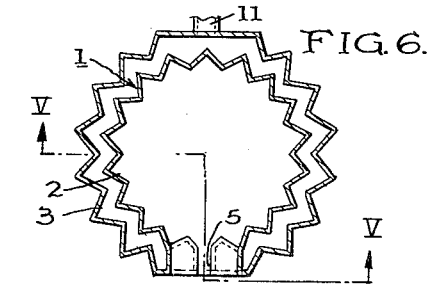
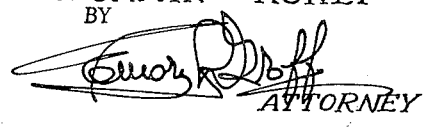
INVENTOR
BENJAMIN KOHLI
BY
ATTORNEY July 24, 1962  B. KOHLI  3,045,661
CENTRAL HEATING BOILER WITH COOKING PLATE
Filed Jan. 24, 1961  2 Sheets-Sheet 2
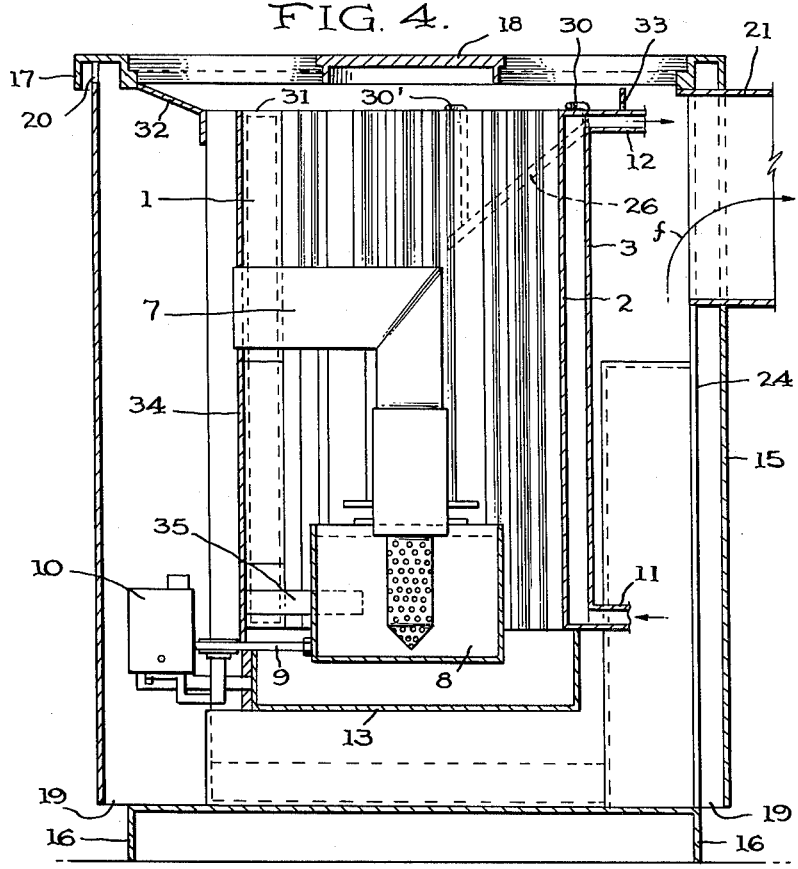
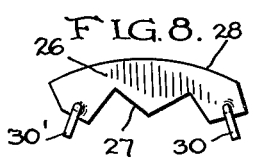
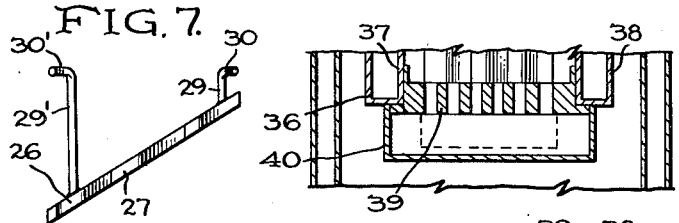
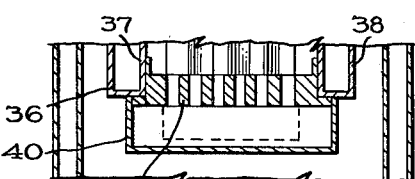
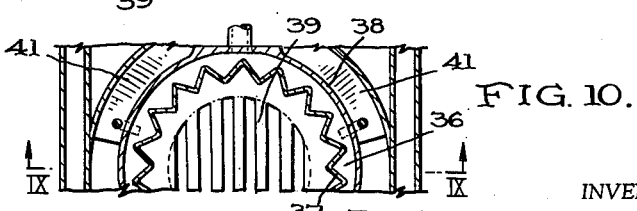
INVENTOR.
BENJAMIN KOHLI
BY
ATTORNEY United States Patent Office 3,045,661
Patented July 24, 1962

3,045,661
CENTRAL HEATING BOILER WITH COOKING PLATE
Benjamin Kohli, Lavey-Village, Vaud, Switzerland
Filed Jan. 24, 1961, Ser. No. 84,567
Claims priority, application Switzerland Jan. 27, 1960
3 Claims. (Cl. 126—34)

The present invention relates to a central heating boiler provided with a cooking plate, comprising a heating body of generally cylindrical shape and having a vertical axis. The body, surrounding the hearth, has two walls for the circulation of water, at least one of said walls comprising a structure designed to increase its heating surface. The outer casing of the boiler has openings for the circulation of cooling air, and includes two intermediate partitions, concentric externally of the heating body, each of which is designed for the heating of the cooling air. The partitions are located between one of the side edges of the boiler casing and the outer wall of the heating body, and the said casing is provided with a cover having at least one cooking plate. At least two detachable plates forming baffles are interposed between the heating body and the outer casing, the said plates being designed to deflect the combustion gases striking against the cover of the boiler in order to urge them along the outer wall of the heating body before their discharge through the smoke duct, so as to ensure simultaneously the heating of the inner and outer walls of the heating body.

The accompanying drawing shows an embodiment and a modification of the boiler of the invention, given by way of example.

FIGURE 1 is an elevational view in section, along the line I—I of FIGURE 2 of the boiler.

FIGURE 2 is a plan view in section, along the line II—II of FIGURE 1.

FIGURE 3 is an partial elevational view in section, along the line III—III of FIGURE 2.

FIGURE 4 is a cross sectional view, along the line IV—IV of FIGURE 2.

FIGURES 5 and 6 show the heating body of the boiler, the left half of FIGURE 5 being a sectional view along the line V—V of FIGURE 6, the right half, a view in elevation, and FIGURE 6, a plan view of FIGURE 5.

FIGURES 7 and 8 show, on a larger scale, a detachable baffle for the circulation of the combustion gases, FIGURE 7 being an elevational view, and FIGURE 8 a plan view of FIGURE 7.

FIGURES 9 and 10 show a modification of the embodiment of the boiler shown in FIGURES 1 to 8, with a coal grate, FIGURE 9 being a partial sectional view along the line IX—IX of FIGURE 10, and FIGURE 10 a partial and sectional view of FIGURE 9.

In the embodiment shown in FIGURES 1 to 8, the central heating boiler, operating with a fuel oil burner, comprises in its central part a combustion chamber including a heating body 1, of generally cylindrical shape, and having a vertical axis. The heating body 1, for example of sheet steel, comprises an inner wall 2 and an outer wall 3, between which water circulates. Each of said vertical walls are of zigzag shape in cross section as shown in FIGURES 2 and 10, and are so designed to increase the heating surface of the said body.

The outer wall of the front part of the heating body 1, comprising a flat surface, presents a gap along its whole height for the passage of the elements of a fuel oil burner. This front part includes an upper cut-out part 4, a central portion 5, of small width, and a lower cut-out part 6. The cut-out part 4 is designed for the passage of a combustive air supply pipe 7 to the tank 8 of the burner, fed by a pipe 9 which is connected to a regulator 10. In its upper part, the outer wall 3 is also provided with a pipe 3' designed to be connected to a thermostat for regulating the water circulation.

The shape of the cut-out parts 4 and 6, as well as of the middle part 5, is determined by the kind of burner with which the boiler is provided.

The outer wall of the rear part of the heating body, forming a flat surface, is provided at its lower end with a supply pipe 11 for the water circulation which arrives from the radiators of the central heating plant, and at its upper end with a water outlet pipe 12 towards the said radiators. The heating body 1 is fixed, for example by welding, at its lower end on a support 13, having the shape of a coffer, made for example of sheet steel. The flat front part of this support is provided with a recess designed for the insertion of an ash-pan, if the boiler operates with coal or wood.

The support 13 is connected to the outer casing 15, of the boiler. Said casing is made of sheet metal for example and is supported by a base 16, also of sheet steel. The casing 15 is also provided at its upper part with a cover 17 the central opening of which is closed by a cooking plate 18.

Above the base 16 and under the support 13 is provided a safety tank, shown in dotted lines in FIGURE 4, the said tank being designed to collect the fuel oil which might brim over the tank 8 of the burner.

Between the outer casing 15 of the boiler and the heating body 1 are provided partitions designed, on the one hand, for the conveyance of the combustion gases in the direction of the flue 21 fixed to a rear longitudinal partition 14, and, on the other hand, for the circulation of the cooling air of the boiler. To this end, two longitudinal partitions 22, 22' are disposed between the side edges of the casing 15 and the front part of the heating body. Moreover, two longitudinal partitions 23, 23' are placed behind the rear part of the heating body and two partitions 24, 24' of rounded shape, are interposed between the partitions 22, 23 and 22', 23' respectively. The said partitions 24, 24' are designed to replace the usual brick walls for retaining the heat, and are disposed concentrically relative to the periphery of the heating body 1.

The cooling air penetrates into the outer casing, on the one hand, by openings 19, made in the lower end of the said casing and, on the other hand, in spaces 25, 25' included between the side edges of the casing 15 and the partitions 22, 23, and 24 and 22', 23' and 24' respectively. The air is then heated by the partitions 24, 24' and discharged outside the boiler by upper openings 20, provided in the casing 15 under the folded over edge of the cover 17, in the direction shown by the arrows f (FIGURES 1 and 3).

The boiler is further provided with detachable plates forming baffles, such as the plate 26 (FIGURES 7 and 8), placed in an inclined position in the space included between the heating body 1 and the curved partition 24. The front edge of the plate 26 is indented with the same spacing as the faces and vertical edges of the wall 3 of the heating body, the rear edge 28 having a rounded surface the radius of which corresponds to that of the curved partition 24. The plate 26 is provided at each of its ends with rods 29, 29' respectively, curved at their free ends 30, 30' respectively, in the shape of a hook, the said hooks bearing on the upper base 31 of the body 1.

Each of the plates 26 could be curved in the shape of a spoon in order to ensure the passage of the combustion gases formed inside the body 1.

These gases are driven towards the bottom of the boiler by the cover 17. The symmetrical baffles 26 direct a portion of the gases into the space included between the body 1 and the curved partitions 24, 24', before the discharge of the said gases by the flue 21. Partitions 32 and 33 (FIGURE 4) are fixed to the upper part of the boiler, the said partitions being designed to separate the cooling air from the smoke circuit, thus allowing heat to spread over the whole surface of the burner plate.

A detachable plate 34 (FIGURES 2 and 4) is fixed to the front part of the heating body 1, the said plate, on which is fixed a support 35 for the tank 8 of the burner, being designed to permit the removal of the burner from the interior of the heating body, in the direction of the arrow f' (FIGURE 1) and the closure of the front opening of the coffer 13.

According to a modification of the embodiment described, the boiler, designed to be heated with coal, includes a heating body 36 (FIGURES 9 and 10), the inner wall 37 of which is similar to the wall 2 of the body 1, the outer wall 38 being of circular section with a constant radius. In the lower part of the body 36 is fixed a coal grate 39, the support 40 of the body 36 being designed to receive the combustion cinders. The coal is introduced by the opening in the cover 17 closed by the heating plate 18. The inner and outer edges of each of the detachable baffles 41 have surfaces with concentric radii, the said baffles being placed and fixed in the same manner as those described for the baffles 26 (FIGURES 7 and 8).

It is obvious that the inner and outer walls of the heating body could be made of corrugated iron, possessing the same property of increasing the heating surface as the zigzag walls described.

I claim:
1. A central heating boiler comprising, in combination,
   a metal casing (15) of horizontally rectangular cross section and constituting the outer walls of the boiler,
   a cover (17) for the casing having at least one cooking plate (18),
   a flange on the cover, the upper edge portion of the walls of the casing (15) spaced inwardly of said flange and having recesses providing air outlets,
   an exhaust flue (21) for said casing (15),
   pedestals (16) supporting the casing (15) and located inwardly of said casing walls to provide space for air to travel upwardly toward the cover (17) and escape at said recesses (20),
   a heating body (1) in the casing (15) of generally cylindrical shape, said heating body (1) including spaced inner (2) and outer (3) walls for the circulation of water and at least one of said walls having corrugations to increase the area of its heating surface,
   two pair of spaced flat partitions (22, 23+22', 23') parallel with opposite walls of the casing (FIG. 2) and located between the outer wall (3) of the heating body (1) and the casing (15),
   arcuate partitions (24, 24') respectively connecting related pairs of intermediate partitions (22, 23+22', 23') to provide a heat generating combustion chamber around the outer wall (3) of the heating body (1) and which chamber communicates with the said exhaust flue (21),
   at least two detachable inclined baffles (26) interposed between the outer wall (3) of the heating body (1) and the said arcuate partitions located at the exhaust flue side of the casing,
   said baffles deflecting the combustion gases from the cover downwardly along said arcuate partitions before discharging through said flue to insure the heating of the inner and outer walls of the heating body (1).

2. A boiler according to claim 1, wherein, the baffles have their inner edge portions indented to fit in the profile of the outer wall (3) of the heating body (1), the opposite ends of said baffles provided with rods having a hook-shaped free end which rests on the upper base portion of the heating body.

3. A boiler according to claim 1, wherein, the heating body is notched for the passage of air inlet and fuel feed pipes respectively of a fuel oil burner.

References Cited in the file of this patent
UNITED STATES PATENTS

| | | |
|---|---|---|
| 914,455 | Piper | Mar. 9, 1909 |
| 2,217,505 | Berkheimer | Oct. 8, 1940 |
| 2,372,086 | Kahn | Mar. 20, 1945 |
| 2,773,488 | MacCracken et al. | Dec. 11, 1956 |